(12) United States Patent
Kulkarni et al.

(10) Patent No.: US 11,354,217 B2
(45) Date of Patent: Jun. 7, 2022

(54) MODIFIED DATABASE TRAFFIC MIRRORING THROUGH A DISTRIBUTED DATA SERVICE

(71) Applicant: eBay Inc., San Jose, CA (US)

(72) Inventors: Sarang Mukund Kulkarni, Folsom, CA (US); Timothy David Robison, Orangevale, CA (US); Steven Bruce West, Roseville, CA (US); Sami Ben Romdhane, Los Altos, CA (US); Douglas Wayne Hathaway, El Dorado Hills, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/774,390

(22) Filed: Jan. 28, 2020

(65) Prior Publication Data

US 2021/0232488 A1 Jul. 29, 2021

(51) Int. Cl.
  *G06F 9/44* (2018.01)
  *G06F 11/36* (2006.01)
  *G06F 17/18* (2006.01)
  *G06F 11/34* (2006.01)

(52) U.S. Cl.
  CPC ...... *G06F 11/3612* (2013.01); *G06F 11/3466* (2013.01); *G06F 11/3664* (2013.01); *G06F 17/18* (2013.01)

(58) Field of Classification Search
  CPC ............. G06F 11/3612; G06F 11/3466; G06F 11/3664; G06F 17/18
  See application file for complete search history.

(56) References Cited

U.S. PATENT DOCUMENTS

| 5,675,731 A * | 10/1997 | Fuller ................. G06F 11/3684 |
| | | 714/38.13 |
| 7,890,457 B2 | 2/2011 | Dias et al. |
| 8,560,502 B2 | 10/2013 | Vora |
| 9,047,251 B2 | 6/2015 | Suganthi et al. |
| 9,331,915 B1 | 5/2016 | Brandwine |

(Continued)

OTHER PUBLICATIONS

Amazon, "What is Traffic Mirroring", Retrieved from the Internet: <https://docs.aws.amazon.com/vpc/latest/mirroring/what-is-traffic-mirroring.html>, 2019, 43 pages.

(Continued)

*Primary Examiner* — Hang Pan
(74) *Attorney, Agent, or Firm* — Fig. 1 Patents

(57) ABSTRACT

Defects are identified in a pre-production version of an application. Input used to test the pre-production version is derived from input received by a production version of the application. Input to the production version may be selectively filtered and/or amplified before being provided as test input to the pre-production version. In this way, the makeup and rate of the test input can be controlled while maintaining the character, pattern, and unpredictable nature of real-world input. Defects may be identified when the test input causes the pre-production version to crash, hang, write to an error log, or otherwise manifest or report a malfunction. In addition to identifying defects, filtered and amplified input may also be used to perform regression testing, load testing, performance testing, etc.

20 Claims, 13 Drawing Sheets

(56) References Cited

U.S. PATENT DOCUMENTS

| | | | |
|---|---|---|---|
| 9,600,393 B2 | 3/2017 | Golde et al. | |
| 2003/0074161 A1* | 4/2003 | Smocha | G06F 11/3466 |
| | | | 702/186 |
| 2004/0103078 A1* | 5/2004 | Smedberg | G06F 16/9566 |
| 2007/0112549 A1* | 5/2007 | Lau | G06F 11/3433 |
| | | | 703/13 |
| 2010/0153319 A1* | 6/2010 | Abrahao | G06F 11/3447 |
| | | | 706/12 |
| 2011/0208875 A1* | 8/2011 | Hasson | H04L 67/1023 |
| | | | 713/320 |
| 2011/0295801 A1* | 12/2011 | Dias | G06F 16/20 |
| | | | 707/622 |
| 2012/0185430 A1* | 7/2012 | Yao | G06F 11/3414 |
| | | | 707/617 |
| 2012/0260132 A1* | 10/2012 | Blue | G06F 11/3676 |
| | | | 714/38.1 |
| 2015/0178066 A1* | 6/2015 | Horn | H04L 41/22 |
| | | | 717/161 |
| 2017/0017650 A1 | 1/2017 | Ciabarra et al. | |

OTHER PUBLICATIONS

U.S. Appl. No. 16/227,529, "Traffic Mirroring", filed Dec. 20, 2018, 32 pages.

* cited by examiner

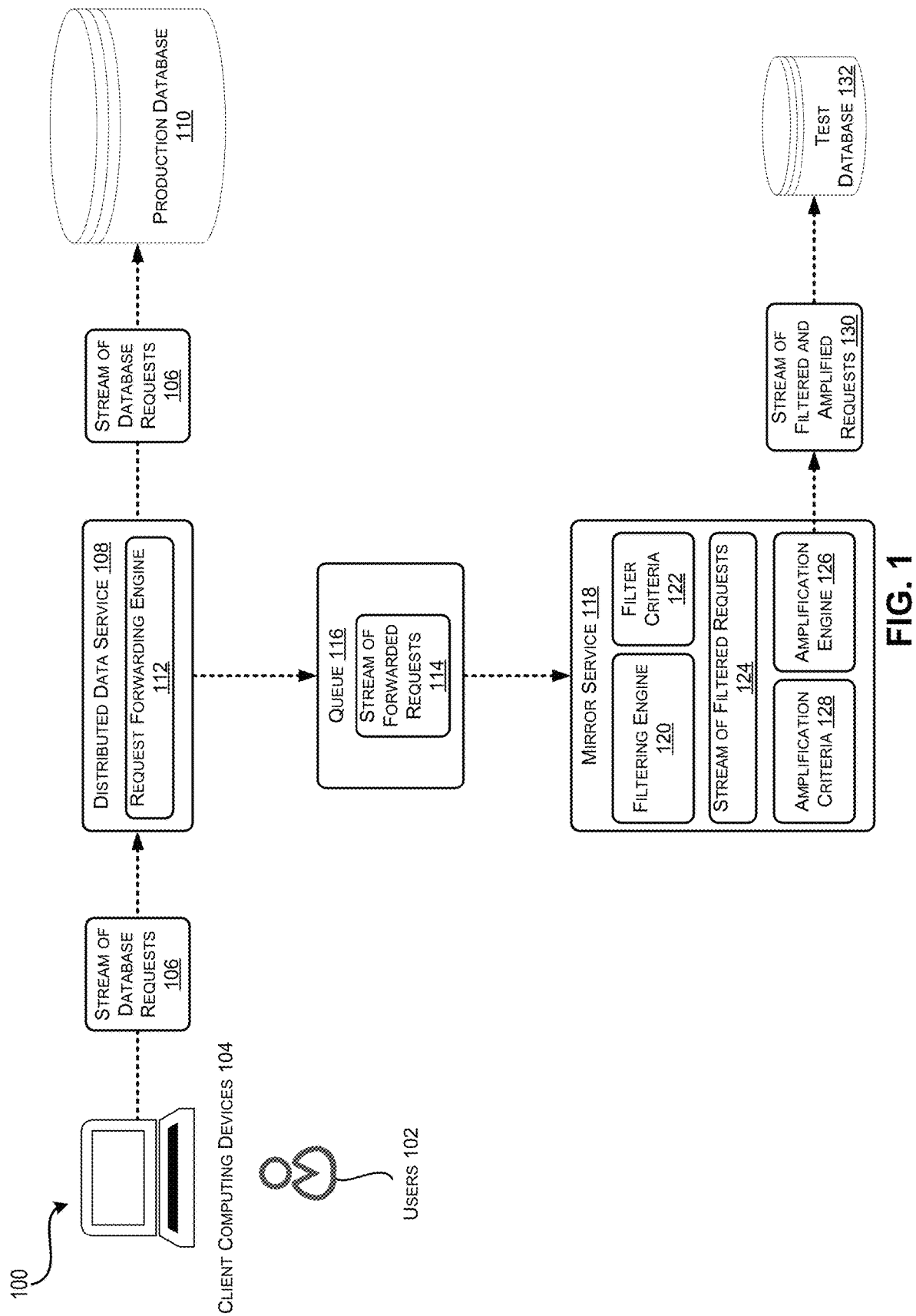

MODIFIED DATABASE TRAFFIC MIRRORING THROUGH A DISTRIBUTED DATA SERVICE

BACKGROUND

Software applications are subject to a quality assurance process. One technique used to test a software application is to provide the application with synthetically generated input, e.g. input generated randomly by an algorithm. For example, a database may be tested by providing the database with randomly generated database queries. However, synthetically generated input may not be representative of input in a production environment. For example, even if the rate of synthetic database queries approaches that of a production environment, the synthetic queries may still not include the sequences, patterns, or variations encountered in a live production environment. Thus, when such products are released to the public, it is not uncommon for unforeseen issues to be encountered quickly.

It is with respect to these and other technical considerations that the disclosure made herein is presented.

SUMMARY

Defects are identified in a pre-production version of an application. In some embodiments, input used to test the pre-production version is derived from input received by a production version of the application. Input to the production version may be selectively filtered and/or amplified before being provided as test input to the pre-production version. In this way, the makeup and/or rate of the test input can be controlled while maintaining the character, patterns, and unpredictable nature of real-world input. Defects may be identified when the test input causes the pre-production version to crash, hang, write to an error log, or otherwise manifest or report a malfunction. In addition to identifying defects, filtered and amplified input may also be used to perform regression testing, load testing, performance testing, etc.

For example, a pre-production version of a database may be tested using requests received by a production version of the database. The production version may be running in a live production environment, receiving requests caused by end-user input. As such, these requests may exhibit unpredictable patterns, swings in volume, and other characteristics of real-world data.

Requests received by the production version of the database may be filtered and/or amplified based on one or more criteria, including request type (e.g. read vs write), request complexity (e.g. simple vs complex), originating application type (e.g. mobile vs desktop), originating user, etc. In some configurations, requests are filtered by removing requests that meet one or more of the criteria. Requests may be amplified by duplicating or culling a defined percentage of requests that meet one or more of the criteria. The selectively filtered and/or amplified requests may then be provided as test input to the pre-production database.

The disclosed technologies address the technical problems presented above, and potentially others, by uncovering defects during a quality assurance process, before the application is deployed to a production environment. The disclosed technologies also allow for reduction of the amount of synthetic testing, thus reducing the waste of computing resources (e.g., amount of memory or number of processor cycles required to generate/create and then test synthetic test input). By amplifying real-world queries to model and test servers, the disclosed technologies further allow for deployment of higher quality code that is assured to be scalable across many computing machines and assured to be more reliable for real-world queries and traffic. Still further, by filtering out traffic that is not helpful in improving reliability/quality of code, the number of processor cycles used, the amount of memory used, and the amount of other computing resources required to assure quality and scalability are reduced. Other technical benefits not specifically mentioned herein can also be realized through implementations of the disclosed technologies.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which reference number first appears. The same reference numbers in different FIGS. indicate similar or identical items.

FIG. 1 is a system diagram illustrating one embodiment disclosed herein;

DETAILED DESCRIPTION

Figure 2A:
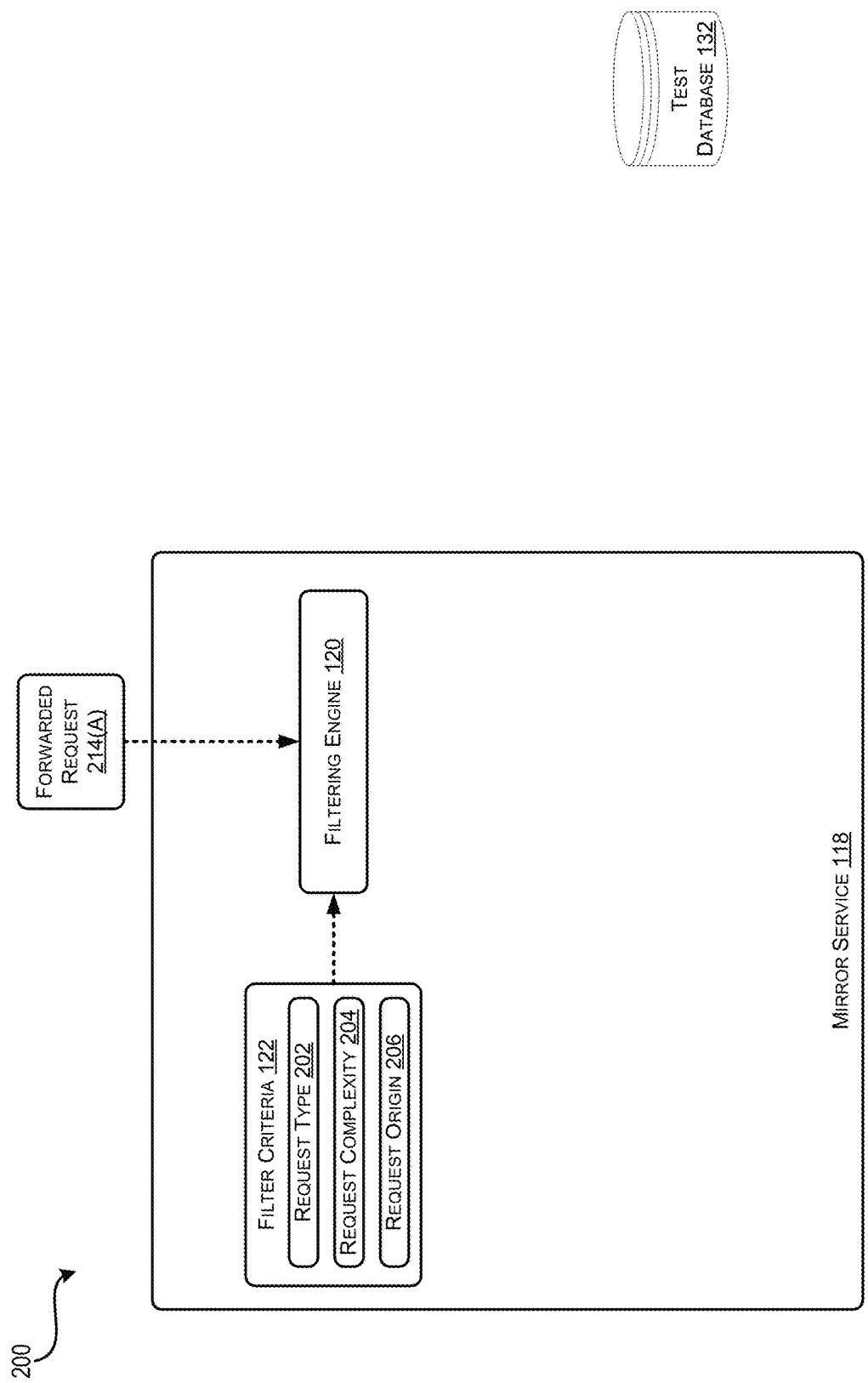
FIG. 2A is a diagram showing aspects of an example mirror service receiving a forwarded database request.

In various embodiments, the following Detailed Description presents technologies for identifying defects in a pre-production version of an application. By identifying defects in a pre-production version, e.g. during a quality assurance phase of development, defects may be found before they cause end users to experience poor application performance, loss of data, security vulnerabilities, or other negative effects.

In some embodiments, input used to test the pre-production version is derived from input received by a production version of the application. Input to the production version may be selectively filtered and/or amplified before being provided as test input to the pre-production version. In this way, the makeup and rate of test input can be controlled while maintaining the character, pattern, and unpredictable nature of real-world input. By maintaining the character, pattern, and unpredictable nature of real-world input, embodiments increase the likelihood that a defect exposed by the test input could have impacted a real user in a live production environment. This is in contrast with defects found using synthetic test input, which may only materialize in contrived scenarios that don't often happen in a production environment.

It is to be appreciated that while the technologies disclosed herein are primarily described in the context of a database receiving database requests, the technologies described herein can be utilized to identify defects in other contexts, which will be apparent to those of skill in the art. For example, the technologies described herein can be utilized in the context of a distributed data store, a Web server, message queues, serverless computing functions, and other "cloud" based functionality, or any other architecture in which a large number of clients submit requests to a server-based application. Requests to any component in any context may be monitored, amplified, filtered and sent to another component in order to test with real-world input.

It is also to be appreciated that 'database', as used throughout this document, refers to one or more tables, views, indexes, stored procedures, and other database object designed and programmed by a software engineer. As such, 'database' does not refer to the underlying database application, e.g. Microsoft SQL Server®.

Referring to the appended drawings, in which like numerals represent like elements throughout the several FIGURES, aspects of various technologies for identifying defects in a pre-production version of an application will be described. In the following detailed description, references are made to the accompanying drawings that form a part hereof, and which are shown by way of illustration specific configurations or examples.

FIG. 1 illustrates an example system 100 that provides a stream of filtered and amplified database requests to a test database. Users 102 may cause client computing devices 104 to submit a stream of database requests 106 to distributed data service 108. Distributed data service 108 may act as a proxy of production database 110, forwarding the stream of database requests 106 to production database 110. A stream of requests refers to a series of requests that are received over a period of time and which are processed in turn.

Distributed data service 108 may include a request forwarding engine 112 that forwards the stream of database requests 106 to queue 116 as a stream of forwarded requests 114. A mirror service 118 may retrieve the stream of forwarded requests 114 from queue 116. In one configuration, the mirror service 118 applies a filtering engine 120 to the stream of forwarded requests 114. The filtering engine 120 may use filter criteria 122 to determine which requests, if any, to filter out. The filtering engine 120 generates a stream of filtered requests 124, which are supplied to amplification engine 126. While FIG. 1 depicts filtering engine 120 is a component of their service 118, this is just one example of where filtering engine 120 may be located. In other embodiments, filtering engine 120 may be a component of forwarding engine 112. When filtering engine 120 is a component of forwarding engine 112, database requests may be filtered out before they are transmitted to mirror service 118, reducing network bandwidth and improving the throughput of distributed data service 108.

Amplification engine 126 uses amplification criteria 128 to change the rate, volume, or frequency of requests provided to a test database 132. For example, amplification engine 126 may duplicate each of the stream of filtered requests 124, doubling the rate of requests received by test database 132. The amplification criteria 128 may also be used to change the makeup of request types received by test database 132. For example, the amplification criteria 128 may be different for different request types, request complexities, request origins, or other factors, causing the rates of these different categories of requests to increase or decrease more than others. Amplification engine 126 may output a stream of filtered and amplified requests 130, which are provided to test database 132.

In some configurations, queue 116 is an asynchronous queue. In order to reduce the overhead incurred to distributed data service 108 by request forwarding engine 112, request forwarding engine 112 may send database requests to queue 116 from the same location in memory as is used to send the database requests to production database server 110. Additionally, or alternatively, when using a TCP/IP protocol, asynchronous queue 116 may only wait for an ACK after sending a database request, i.e. not waiting for a TCP/IP response indicating the entire transmission was a success. In this way, request forwarding engine 112 may release resources used to store a database request sooner than if waiting for a full TCP/IP response.

FIG. 2A illustrates a diagram 200 showing aspects of an example mirror service 118 receiving a forwarded database request 214(A). Forwarded request 214(A) may be one of the stream of forwarded requests 114. Filtering engine 120 may receive the forwarded request 214(A) and apply one or more of filter criteria 122 to determine whether to exclude (or include) forwarded request 214(A).

Filter criteria 122 may include request type 202, request complexity 204, request origin 206, or any other attribute, parameter, category, or other distinguishing feature of a request. Filtering engine 120 may use one or more of filter criteria 122 in combination, e.g. by filtering out all read requests that take less than 50 milliseconds to be processed, or by filtering out all write requests that take more than 100 milliseconds and which are received from a mobile device.

In the context of a database, request type 202 may refer to whether the forwarded request 214(A) is a read request, e.g. a SELECT query, or a write request, e.g. an INSERT, UPDATE, or DELETE statement. Request type 202 may also specify particular types of read or write requests, e.g. request type 202 may cause all UPDATE requests to be filtered out. However, read and write requests are only examples of different types of requests. In the context of a web application that receives HTTP requests, the request type 202 may refer to an HTTP request method, e.g. GET, PUT, POST, and DELETE. Other request types processed by other applications are similarly contemplated.

In some configurations, the request complexity 204 may refer to a threshold amount of computing resources the test database 132 will use to process the forwarded request 214(A). In some embodiments, request complexity 204 may exclude requests that exceed the threshold. In other embodiments, request complexity 204 may exclude requests that fail to meet the threshold. Filtering engine 120 may apply multiple request complexity criteria 204 to determine whether to exclude a forwarded request 214(A). For example, filtering engine 120 may exclude a forwarded request 214(A) if processing the request is estimated to take less than a first threshold of computing resources or more than a second threshold of computing resources. Filtering engine 120 may also apply request complexity 204 in conjunction with other criteria, e.g. request type 202 and request origin 206.

In some configurations, the computing resources threshold may be defined as an amount of time used by the test database 132 to perform the forwarded request 214(A). For example, request complexity 204 may exclude requests estimated to take more than 50 milliseconds to be processed. Additionally, or alternatively, the threshold may be defined as a number, amount, or percentage of computing resources used to perform the forwarded request 214(A). For example, request complexity 204 may indicate a number, amount, or percentage of processing, non-volatile storage, memory, network, or other computing resources. For example, request complexity 204 may exclude a forwarded request 214(A) that is estimated to consume more than 100 kB of non-volatile storage.

Filtering engine 120 may estimate the number, amount, or percentage of computing resources used to process the forwarded request 214(A) in a number of ways. Filtering engine 120 may break the forwarded request 214(A) into a number of sub-operations, estimate the computing resources used to perform each sub-operation, and aggregate the results. Filtering engine 120 may also derive an estimate based on historic metrics of computing resources used to process similar if not identical requests.

For example, filtering engine 120 may break a SQL SELECT query into sub-operations such as a table scan, join, stored procedure, etc. Estimates of the computing resources used to perform these sub-operations may then be aggregated into an overall estimate of the computing resources used to process forwarded request 214(A). Additionally, or alternatively, Filtering engine 120 may adjust the estimated number of computing resources by determining how many columns are selected, whether and how the queried tables are indexed, whether the query can be performed on a single computing device or whether the query will be performed across multiple computing devices, and the like.

The request origin 206 filter criteria may refer to who or what originated the forwarded request 214(A), or where the forwarded request 214(A) originated from. For example, in some configurations, the request origin 206 may be set to exclude requests received from a particular user or group of users based on a user identifier included in the forwarded request 214(A). The request origin 206 may also exclude requests from a particular geographic region, political entity, or other location context. The request origin 206 may also exclude requests that originate from a particular type of device (e.g. mobile phone, tablet, desktop, or server), a particular type of software used to send the request (e.g. native application, web application), a particular brand or version of software (e.g. Chrome™, Edge™, or Safari™ browsers), or the like Filter criteria 122 may include other criteria that are specific to a type of forwarded request. For example, if forwarded request 214(A) contains source code to be executed by test database 132, e.g. a Transact-SQL statement, filter criteria 122 may exclude a request based on whether the source code executes a particular function. Filtering engine 120 may parse the source code contained in the forwarded request 214(A) to determine if the particular function is invoked.

In another embodiment, filtering engine 120 may exclude forwarded requests 214(A) that contain a particular type of function. For example, filter criteria 122 exclude requests that contain administrative functions, functions that invoke remote resources, or any other function classification. In another embodiment, filter criteria 122 may exclude a request that passes a particular value or range of values as a parameter to a function invoked by the forwarded request 214(A).

Other types of forwarded requests are similarly contemplated. For example, if forwarded request 214(A) refers to a file hosted by the application, e.g. as part of a download request, filter criteria 122 may exclude the forwarded request 214(A) based on a file name, file type, file path, file creation time, or any other property of the requested file. Filtering allows removal of requests that are not suitable for a test or staging environment, thereby avoiding needless errors. In some configurations, if the forwarded request 214(A) contains a message, email, JSON object, XML, or the like, filter criteria 122 may exclude the forwarded request 214(A) based on an attribute, property, tag, or other feature of the request. For example, the forwarded request 214(A) may be excluded if a JSON object included in the request has a "UserAge" property that is less than 21.

Figure 2B:
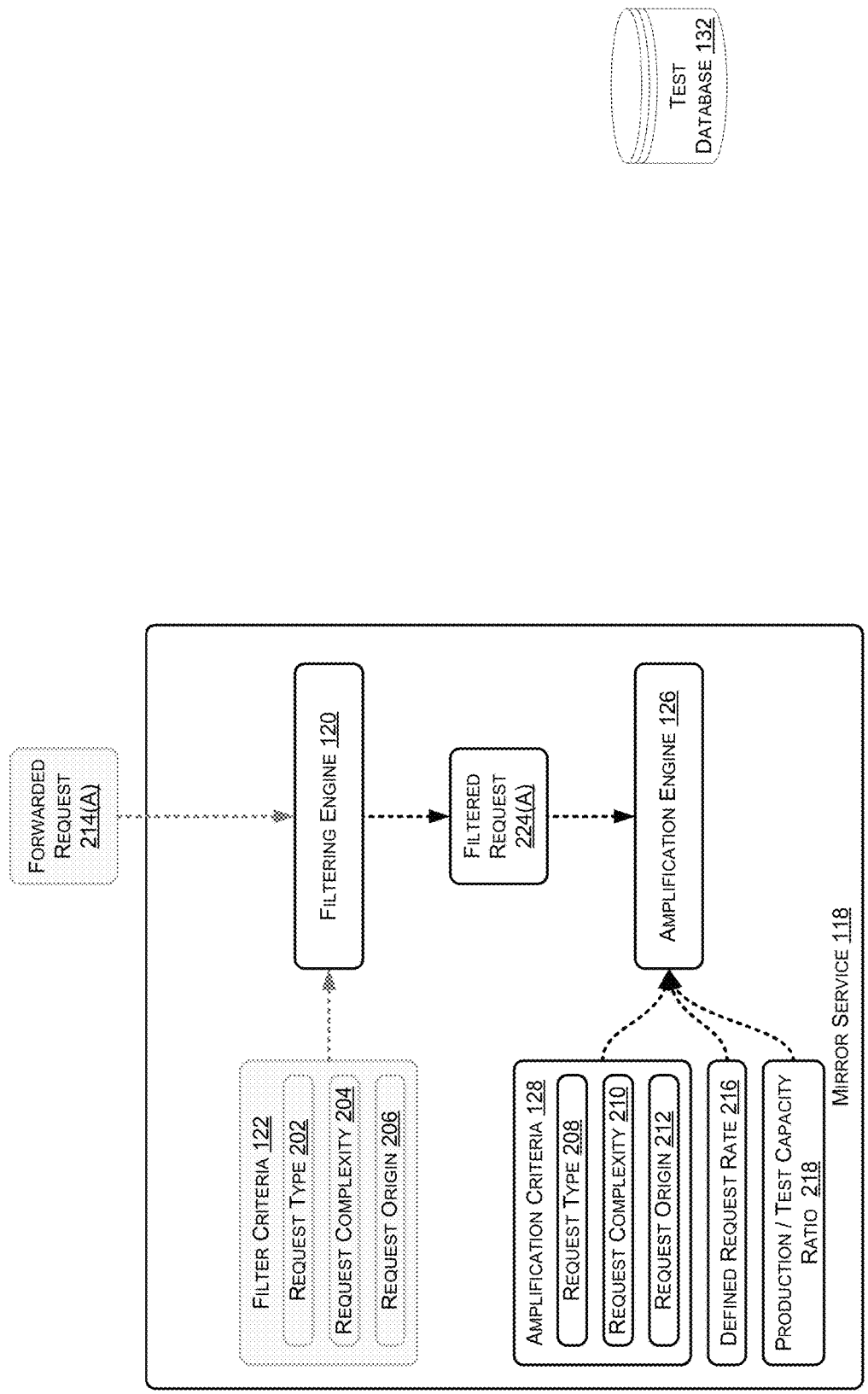
FIG. 2B is a diagram showing aspects of an example mirror service providing requests filtered by a filtering engine to an amplification engine.

FIG. 2B is a diagram showing aspects of an example mirror service 118 providing requests filtered by the filtering engine 120 to an amplification engine 126. In some embodiments, the filtering engine 120 provides filtered request 224(A) to amplification engine 126. Filtered request 224(A) may be one of the requests of the stream of filtered requests 124 discussed above in conjunction with FIG. 1. Amplification engine 126 may use amplification criteria 128, including request type 208, request complexity 210, and request origin 212, when determining which requests of the filtered request stream 124 to amplify. Amplification engine 126 may also use a defined request rate 216 and a production-to-test capacity ratio 218 when determining which requests of the filtered request stream 124 to amplify.

In some configurations, amplification engine 126 increases or decreases the rate, volume, or frequency of requests included in the filtered request stream 124. Amplification engine 126 may also alter the makeup and distribution of different types of requests by selectively altering the rates, volumes, and frequencies of different request classifications. In some configurations, amplification engine 126 makes these adjustments by culling or duplicating requests in the filtered request stream 124.

For example, amplification engine 126 may double the rate of requests by duplicating each filtered request 224(A) of the filtered request stream 124. A software engineer may double the rate of requests in order to perform load testing, in order to reproduce a defect that has only been observed under high load, or in order to confirm the validity of a fix for a defect that has only been observed under high load.

Even though the filtered request stream 124 has been altered by duplicating each filtered request 224(A), the character, patterns, and unpredictable nature of real-world input is maintained.

Amplification engine 126 may halve the rate of requests by culling 50% of the filtered requests 224(A) from the filtered request stream 124. In some configurations, amplification engine 126 may cull individual filtered requests 224(A) at random—e.g. each filtered request 224(A) may have a 50% chance of being filtered out. A software engineer may choose to halve the rate of requests in order to scale the rate of requests to the capacity of test database 132. For example, production database 110 may have four times the computing capacity of test database 132. By halving the rate of requests, the resulting stream of requests may be more appropriate for the test database 132.

Amplification engine 126 may achieve any amplification factor, not just integer multipliers or fractions, by selectively duplicating or culling specific percentages of the stream of filtered requests 124. For example, in order to generate requests at a rate 2.4 times that of the stream of filtered requests 124, amplification engine 126 may duplicate each filtered request 224A once, while randomly duplicating 40% of each filtered request 224A a second time.

Amplification engine 126 may apply different amplification factors to different requests based on the amplification criteria 128. In some configurations, amplification criteria 128 are the same criteria as the filter criteria 122 described above in conjunction with FIG. 2A. For example, request type 208, request complexity 210, and request origin 212 may correspond to the request type 202, request complexity 204, and request origin 206 described above in conjunction with FIG. 2A.

For example, amplification engine 126 may duplicate 50% of all requests that have a request type 208 of "read" (e.g. a SELECT query or an HTTP GET method). At the same time, amplification engine 126 may also duplicate 75% of requests with a high request complexity 210 (e.g. that are estimated to take at least 100 milliseconds to be processed by test database 132) three times. By applying different multiplication factors to request of different types, amplification 126 may adjust the makeup and distribution of requests provided to the test database 132.

In some configurations, amplification engine 126 may derive one or more multipliers such that the rate of requests provided to the test database 132 is made equal to the defined request rate 216. For example, if the defined request rate 216 is 400 requests per second, and if the stream of filtered requests 124 has an average rate of 200 requests per second, amplification engine 126 may divide the defined request rate 216 by the recorded rate to determine a multiplier. In this example, 400/200 yields a multiplier of 2.0. The amplification engine 126 may then calculate how to implement the multiplier, i.e. by determining what percentage of requests to duplicate or cull, and how many times to duplicate them. Continuing the example, implementing a multiplier of 2.0 can be achieved by duplicating each filtered request 224(A) once.

Some clients 104 may vary the rate at which requests are provided, and so amplification engine 126 may periodically update the multiplier used to maintain the defined request rate 216. For example, if the average rate of requests per second provided by the stream of filtered requests 124 jumped to 500 requests per second, the defined rate 216 divided by the recorded rate, i.e. 400/500, yields a multiplier of 0.8. To implement this multiplier, amplification engine 126 may determine to cull 20% (i.e. retaining 80%) of the stream of filtered requests 124. In some configurations, the amount of time amplification engine 126 looks back when calculating the average rate of requests received is configurable, e.g. by a user, by a configuration file, or the like.

In some configurations the production-to-test capacity ratio 218 represents how much more or less computing capacity production database 110 has available compared to test database 132. Production-to-test capacity ratio 218 may be used to adjust the rate of requests sent to the text database 132 in order to compensate for the difference in computing capacities. For example, if the production-to-test capacity ratio 218 is 4:1, it indicates that production database 110 is operating on a computing device that is four times as powerful than test database 132. In these scenarios, the inverse of the production-to-test capacity ratio 218, ¼ may be incorporated into the amplification factor. For example, if defined request rate 216 is 2.0, the production-to-test capacity ratio 218 may be incorporate by multiplying with the defined request rate 216. In this example, 2.0*¼ yields an amplification factor of 0.5

In some configurations, request forwarding engine 112 and mirror service 118 may be used to perform a capacity test on the test database 132. For example, amplification engine 126 of mirror service 118 may apply different application criteria to the stream of database requests over time, increasing the rate at which requests are provided to test database 132. The rate at which requests are provided to test database 132 may be increased until a performance slowdown is noticed in test database 132 beyond a defined threshold. Once the defined threshold has been met, the capacity of the test database 132 is determined to be the rate of requests received before the performance slowdown.

Similarly, request forwarding engine 112 and mirror service 118 may be used to measure a performance impact of a new version of a database or a database configuration change. For example, filter criteria 122 and amplification criteria 128 may remain unchanged while a database administrator adds a database index to a table in the test database 132. Performance metrics of the test database 132 may be measured before and after this configuration change, giving an indication of the performance impact of adding the index. A similar evaluation may be performed before and after the new version of the database is installed.

Figure 2C:
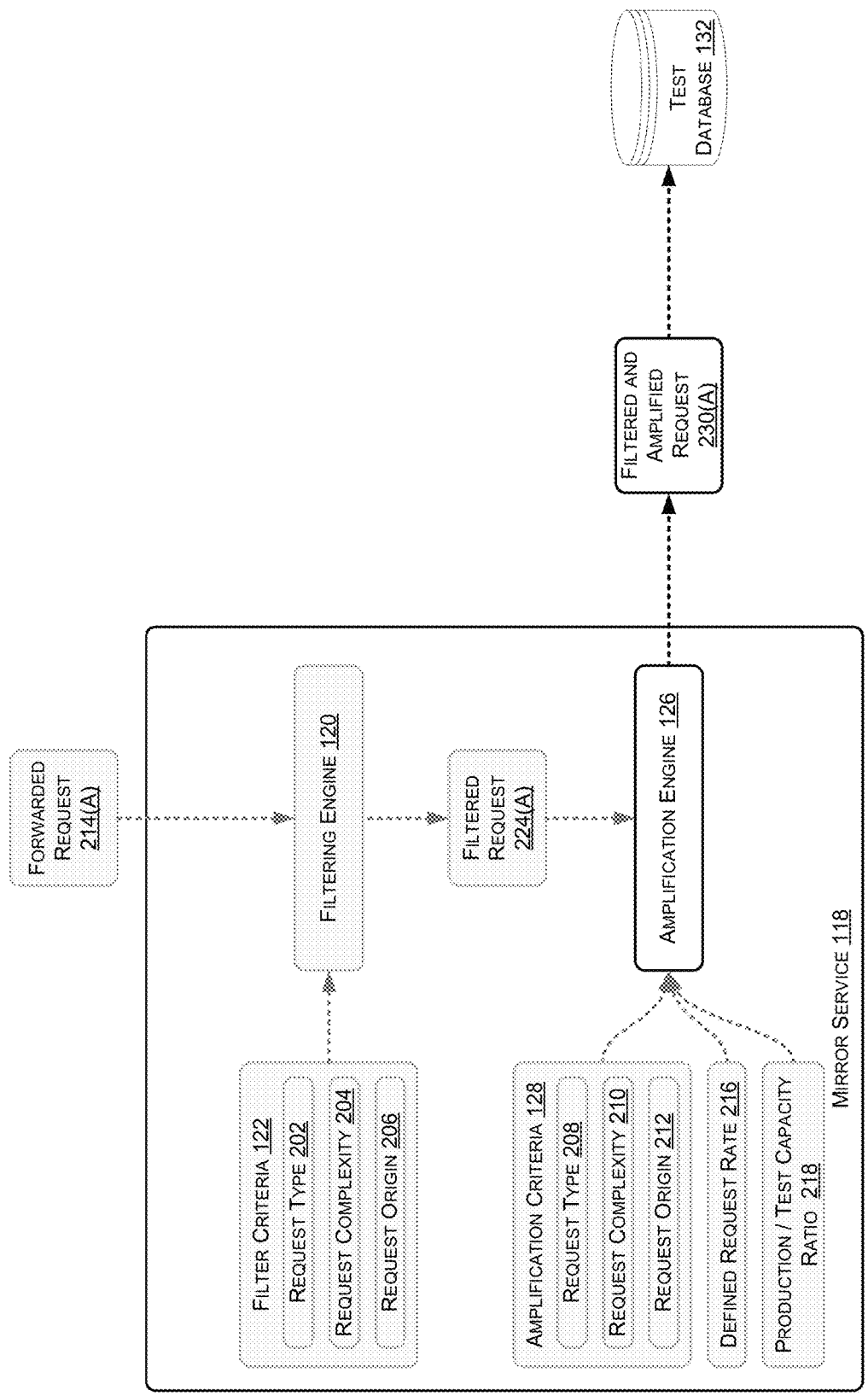
FIG. 2C is a diagram showing aspects of an example mirror service providing a filtered and amplified request to a test database.

FIG. 2C is a diagram showing aspects of an example mirror service 118 providing a filtered and amplified request to the test database 132. Filtered and amplified request 230(A) is one of the stream of filtered and amplified requests 130. Filtered and amplified request 230(A) may be an original data base request received from one of the computing devices 104. Alternatively, filtered and amplified request 230(A) may be a duplicate generated by amplification engine 126.

In some configurations, one or more requests of the stream of database requests 106 is associated with one or more criteria, e.g. at least one of filter criteria 122 or amplification criteria 128, as discussed above. In these cases, the stream of database requests 106 may have a particular distribution of request criteria. For example, if 20% of the plurality of requests are write requests, while 80% are read requests, the resulting distribution is 80% read requests and 20% write requests.

Some requests may be associated with multiple criteria, e.g. a request may have a 'read' request type 202 while having a 'simple' request complexity 204. In this case, the criteria distribution may refer how many requests have each individual criterion. In some embodiments, a criteria distribution includes the number of requests that are associated with multiple criteria. Continuing the example, the criteria distribution may include the number of requests that have a 'read' request type 202 and a 'simple' request complexity 204. In some embodiments, the criteria distribution of the stream of database requests 106 is similar to, within a defined margin of error, the criteria distribution of the stream of filtered and amplified requests 130.

In some configurations, the database requests of the stream of database requests 106 may be received with a particular frequency, pattern, or rate. The frequency, pattern, or rate, may be a result of end-user input to computing devices 104. For example, the rate of database requests may spike during lunchtime, when workers spend more time browsing websites. Similarly, database requests may exhibit a different pattern around the holidays when online retail sales are at a peak. In some embodiments, the results of filtering and amplifying the stream of database requests 106 maintains, to within a defined margin of error, the same frequency, pattern, or rate of database requests.

Figure 2D:
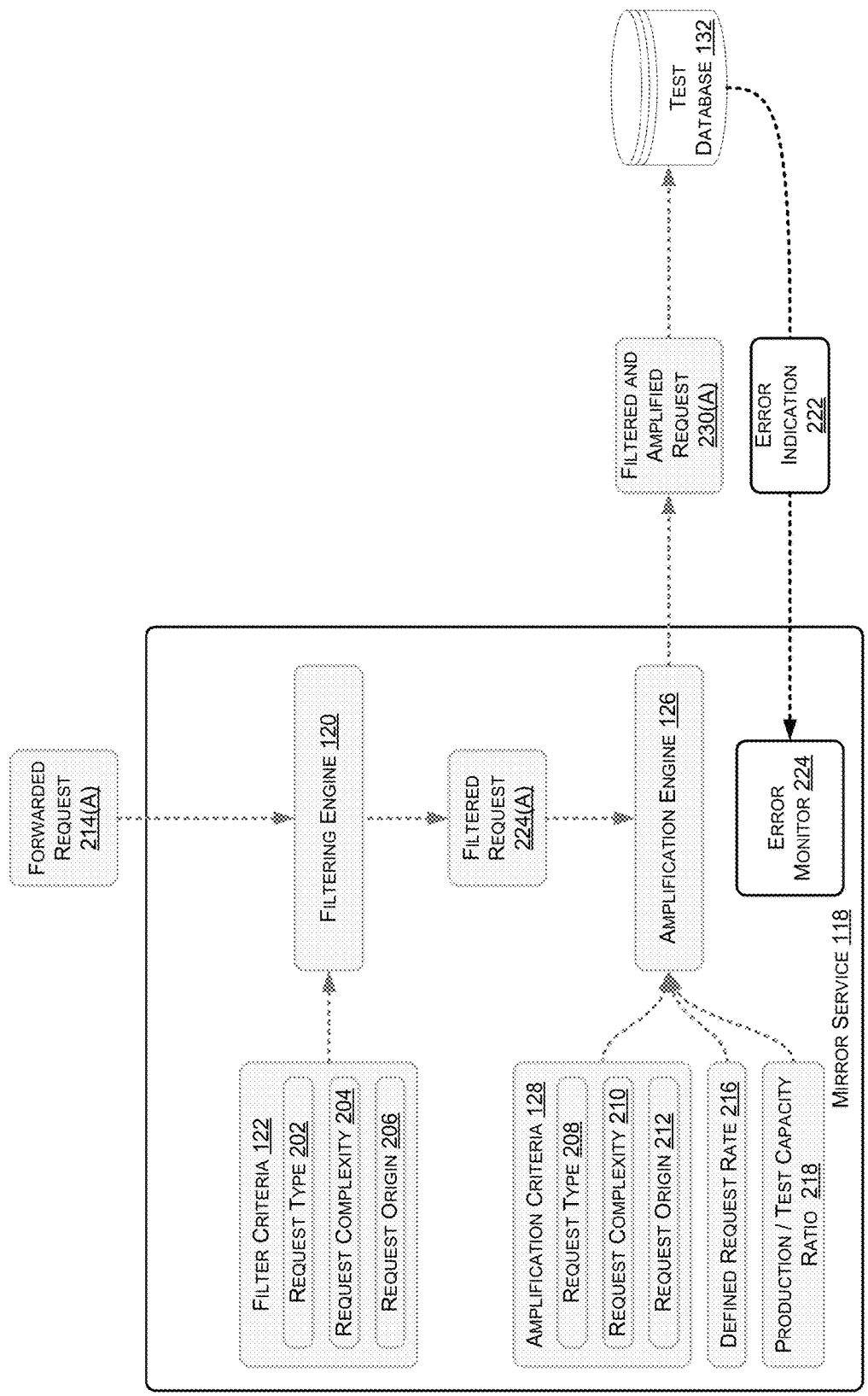
FIG. 2D is a diagram showing aspects of an example mirror service receiving an indication of an error caused by a filtered and amplified request.

FIG. 2D is a diagram showing aspects of an example mirror service 118 receiving an indication of an error 222 caused by the filtered and amplified request 230(A). In some configurations, error monitor 224 receives the error indication 222 as a response to the filtered and amplified request 230(A). Additionally, or alternatively, error monitor 224 may register with test database 132 to receive error indications in another way. For example, error monitor 224 may register to receive contents of an error log generated by test database 132. Error monitor 224 may parse the error log to identify errors generated by the filtered and amplified request 230(A). In other configurations, mirror service 118 does not contain or use error monitor 224, in which case a software engineer may rely on other techniques to determine if an error has occurred in test database 132.

Figure 2E:
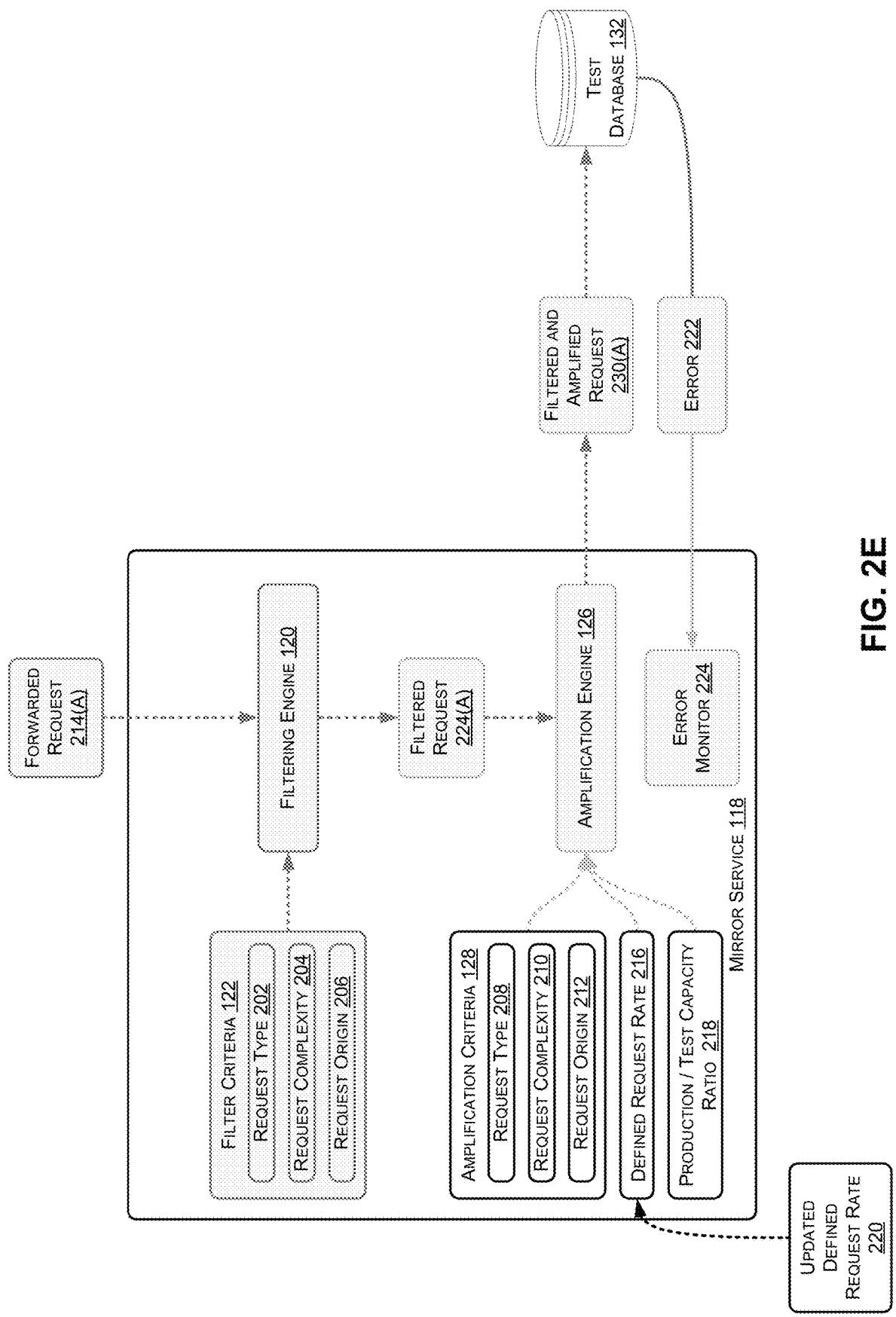
FIG. 2E is a diagram showing aspects of an example mirror service receiving an updated request rate.

FIG. 2E is a diagram showing aspects of an example mirror service 118 receiving an updated request rate 220. As discussed above in conjunction with FIG. 2B, the defined request rate 216 can be used to derive an amplification factor. When the amplification factor is applied to the stream of filtered requests 124, it causes the test database 132 to receive filtered and amplified requests at the defined request rate 216.

Different uses of the disclosed embodiments may be best served by different defined request rates. For example, when reproducing an error condition detected in a live production environment, the defined request rate 216 may be set to the request rate that existed when the error condition was detected in the production database 110.

The defined request rate 216 may be updated, e.g. by an algorithm, user input, a configuration file, etc. For example, when reproducing the error condition detected in a live production environment, the request rate that triggered the error in the production database 110 may not trigger the error condition in test database 132. To compensate, updated defined request rate 220 may be used to replace the defined request rate 216. For example, updated defined request rate 220 may be iteratively applied to increase the defined request rate 216 until the error condition is reproduced. In another embodiment, when performing a load test on test database 132, updated defined request rate 220 may be used to iteratively increase the defined request rate 216 until a maximum sustainable load of test database 132 is determined.

Figure 2F:
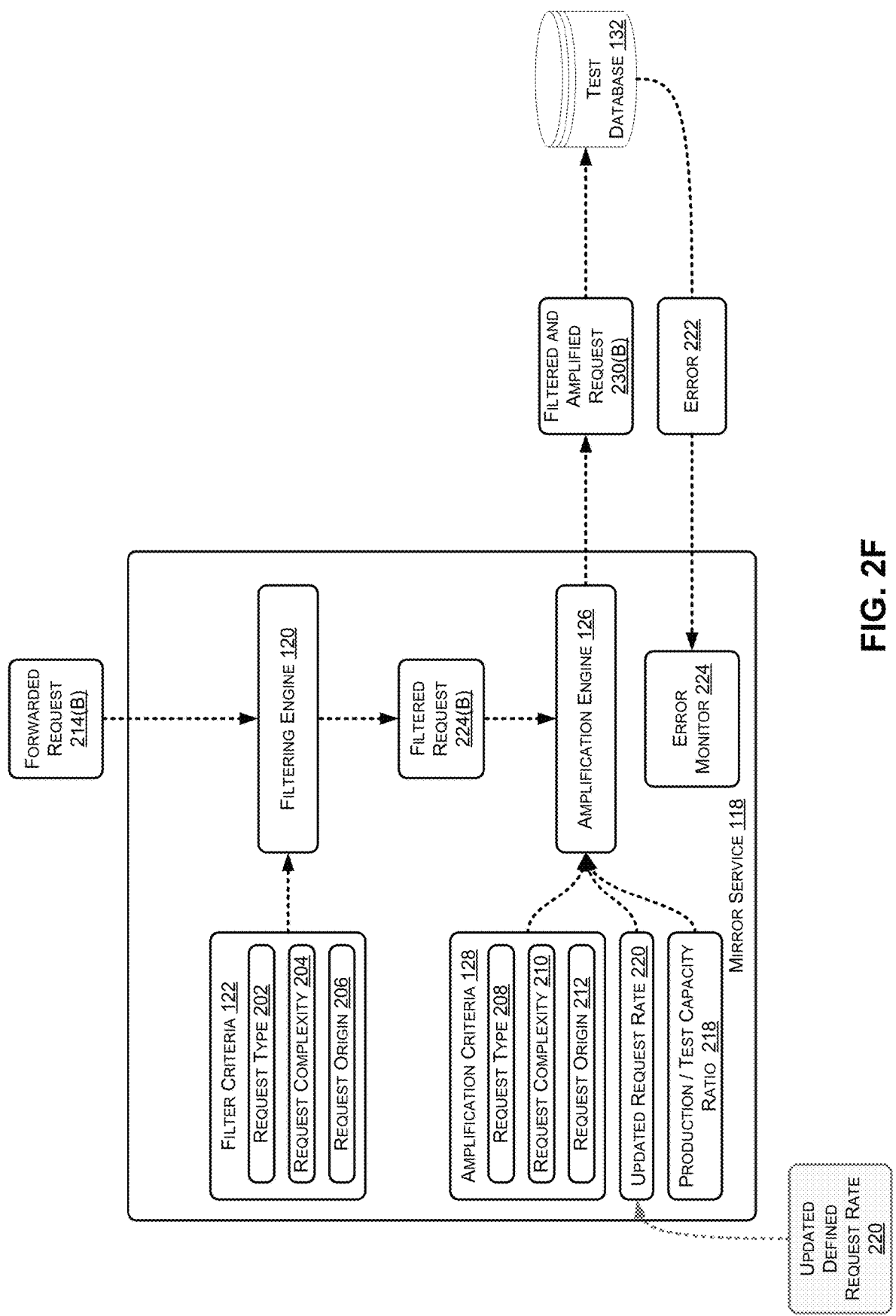
FIG. 2F is a diagram showing aspects of an example mirror service processing a forwarded database request using an updated request rate.

FIG. 2F is a diagram showing aspects of an example mirror service 118 processing a forwarded database request 224(B) using the updated request rate 220. In some configurations, updated request rate 220 is iteratively updated until error monitor 224 detects an error 222.

Figure 3:
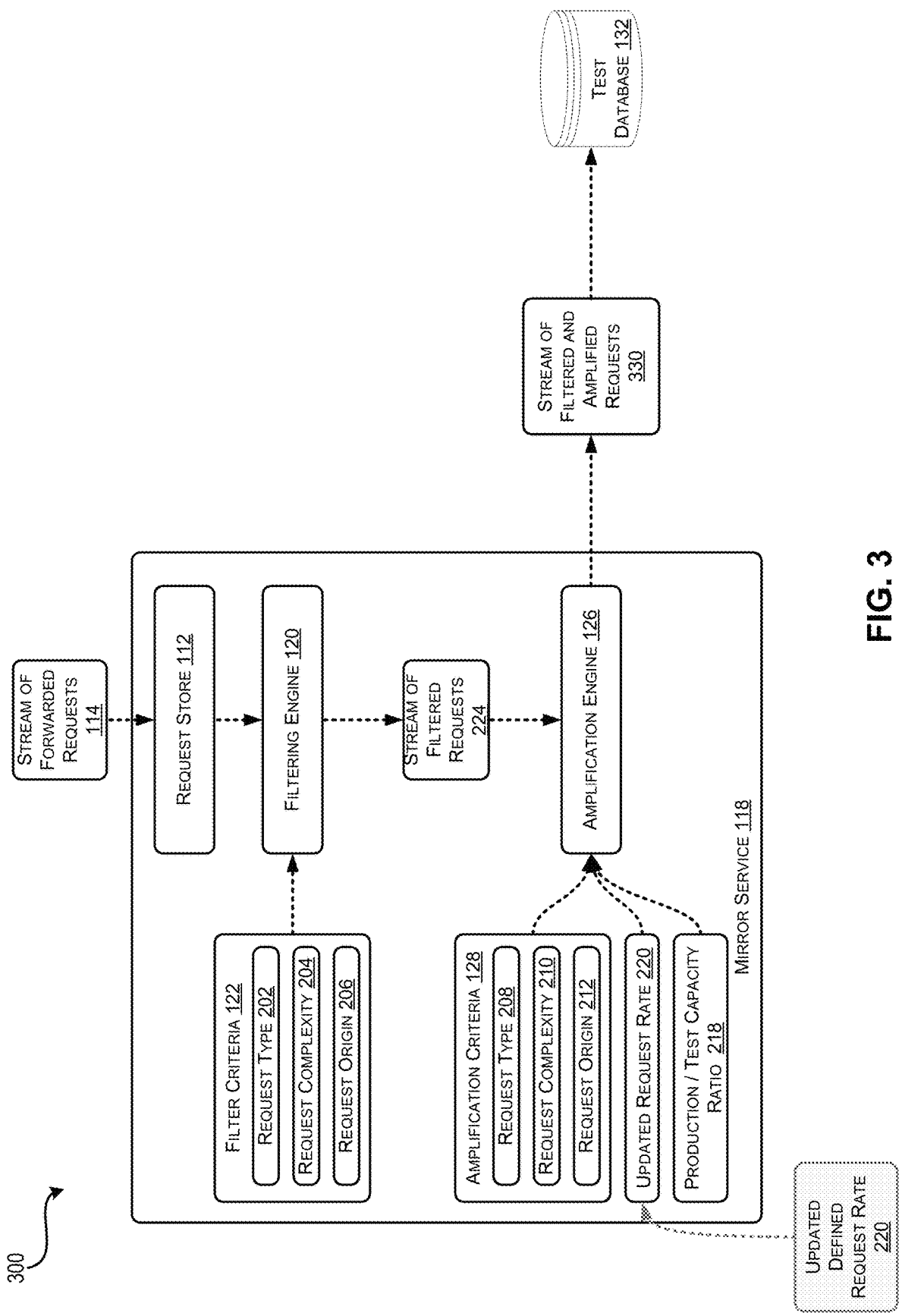
FIG. 3 is a diagram showing aspects of an example mirror service using stored database requests as the basis of a filtered and amplified request stream.

FIG. 3 is a diagram 300 showing aspects of an example mirror service 118 using stored database requests as the basis of a filtered and amplified request stream 330. In some configurations, request store 112 stores the database requests provided by the stream of forwarded requests 114. Request store 112 may store as many of these requests as is allowed by the available storage space. By storing requests received from the stream of forwarded requests 114, the mirror service 118 is able to replay particular sequences of stored requests.

Replaying particular sequences of stored requests is in contrast to the embodiments described above and condition with FIGS. 2A-2F. In these embodiments, test database 126 is always supplied with requests captured from a live production environment. As such, even if a test utilizing mirror service 118 is repeated, the specific requests received by test database 132 are likely to be different for each iteration.

By storing requests and replaying them, scenarios that require a greater degree of consistency are enabled. For example, elusive defects, e.g. a defect that occurs once every six months, may only be reproduced after a specific series of requests. By replaying this specific series of requests from the request store 112, the chances of reproducing the elusive defect are increased.

Furthermore, by enabling the stream of forwarded requests 114 to be replayed any number of times from request store 112, filter criteria 122, amplification criteria 128, defined request rate 116, and production-test capacity ratio 218 may be adjusted as many times as is required to cause the defect to be consistently reproduced by the test database 132. Once the elusive defect can be consistently reproduced it is easier for software engineers to find the cause of the defect. Similarly consistently reproducing the defect makes it easier for software engineers to confirm that a fix is effective and that it does not introduce any new defects.

In some configurations, upon encountering an error, production database 110 may take a snapshot of the current state of the database. In order to better recreate the context in which the error occurred, the test database may be loaded with the snapshot before the sequence of requests are replayed from request store 112.

Figure 4:
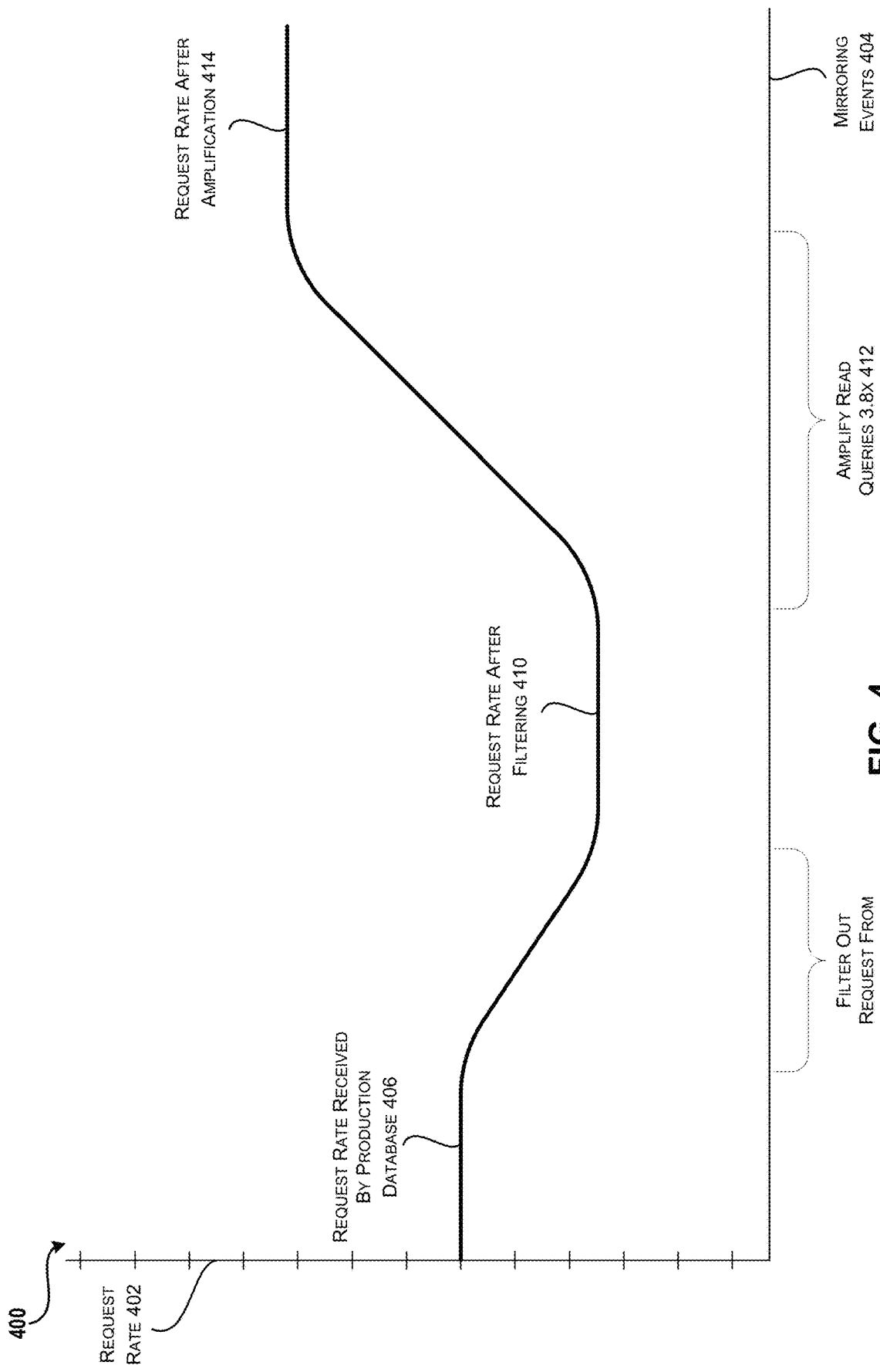
FIG. 4 is a diagram illustrating a graph of an example request rate as a stream of requests is filtered and amplified.

FIG. 4 is a diagram 400 illustrating a graph of an example request rate as a stream of requests is filtered and amplified. The vertical axis of the graph indicates a request rate 402 supplied by the computing devices 104. The horizontal axis of the graph indicates mirroring events 104 that are applied to the stream of database requests 106 by mirror service 118.

As illustrated by FIG. 4, request rate received by production database 406 illustrates the rate of requests provided by the stream of database requests 106. Filter out request from mobile devices 408 is one example of filtering the stream of database requests 106. As illustrated, after requests from mobile devices have been filtered out, the request rate drops to the level indicated by request rate after filtering 410. Next, an amplification process, amplified freed queries 3.8×412 is applied, increasing the request rate to request rate after amplification 414.

Although FIG. 4 illustrates the rate of database requests changing gradually over time, this is for illustration purposes, and the rate of change is not limiting. For example, the rate of database requests may change quickly, if not instantaneously.

Figure 5:
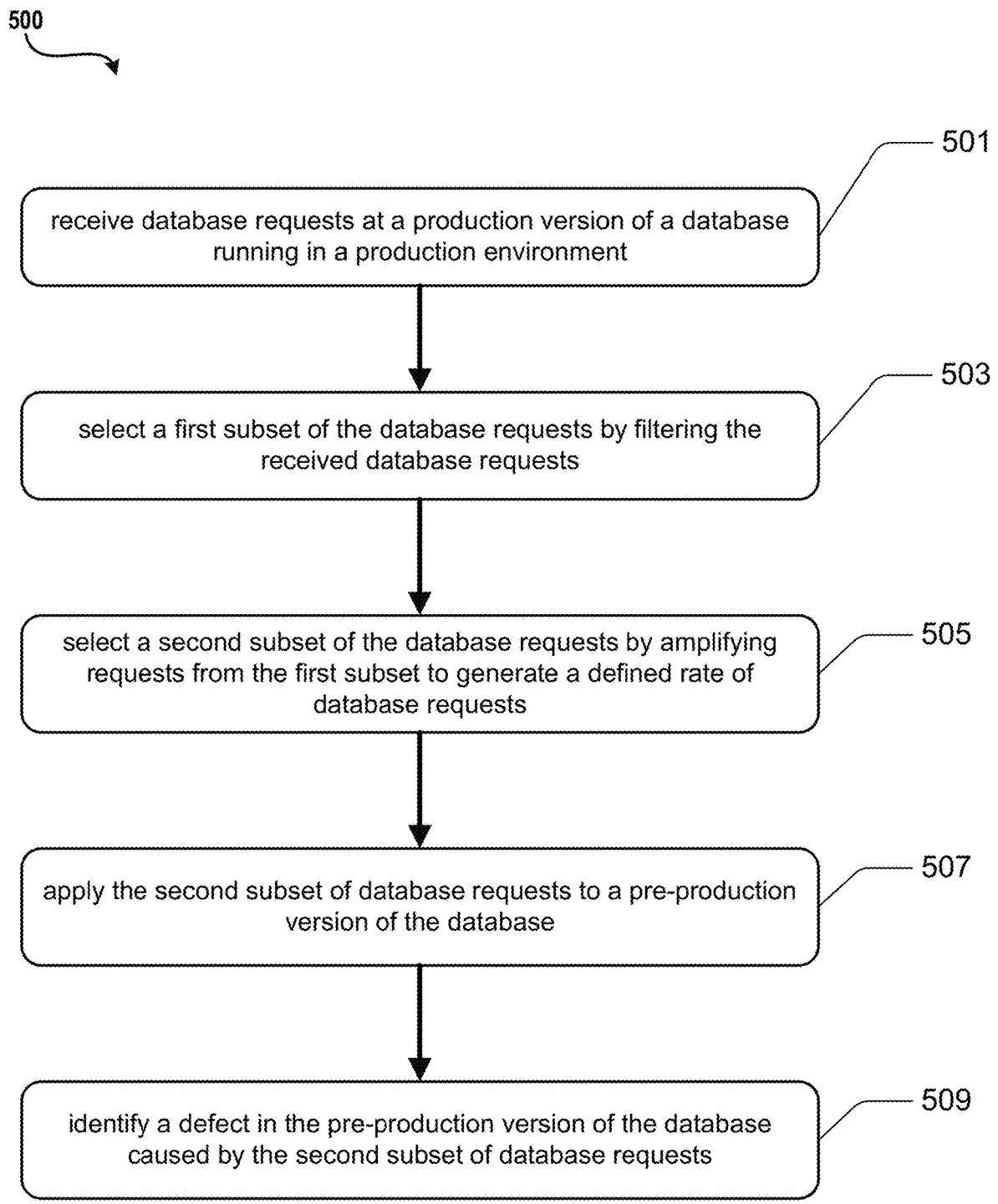
FIG. 5 is a flow diagram showing aspects of an illustrative routine, according to one embodiment disclosed herein.

FIG. 5 is a diagram illustrating aspects of a routine 500 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The routine 500 begins at operation 501, which illustrates receiving database requests at a production version of a database running in a production environment. The received database requests may be the stream of database requests 106 as discussed above in conjunction with FIG. 1.

The routine 500 then proceeds to operation 503, which illustrates selecting a first subset of the database requests by filtering the received database requests. Operation 503 may be performed by filtering engine 120, as discussed above in conjunction with FIG. 2A. In one embodiment, the first subset of the database requests is selected by applying one or more filter criteria 122. The first subset of the database requests may be the stream of filtered requests 124.

The routine 500 then proceeds to operation 505, which illustrates selecting a second subset of the database requests by amplifying requests from the first subset to generate a defined rate of database requests. Operation 505 may be performed by the amplification engine 126 discussed above in conjunction with FIG. 2B.

The routine 500 then proceeds to operation 507, which illustrates applying the second subset of database requests to a pre-production version of the database. Operation 507 may also be performed by amplification engine 126, as discussed above in conjunction with FIG. 2C.

The routine 500 then proceeds to operation 509, which illustrates identifying a defect in the pre-production version of the database caused by the second subset of database requests. Operation 509 may be performed by error monitor 224 as discussed above in conjunction with FIG. 2D.

Figure 6:
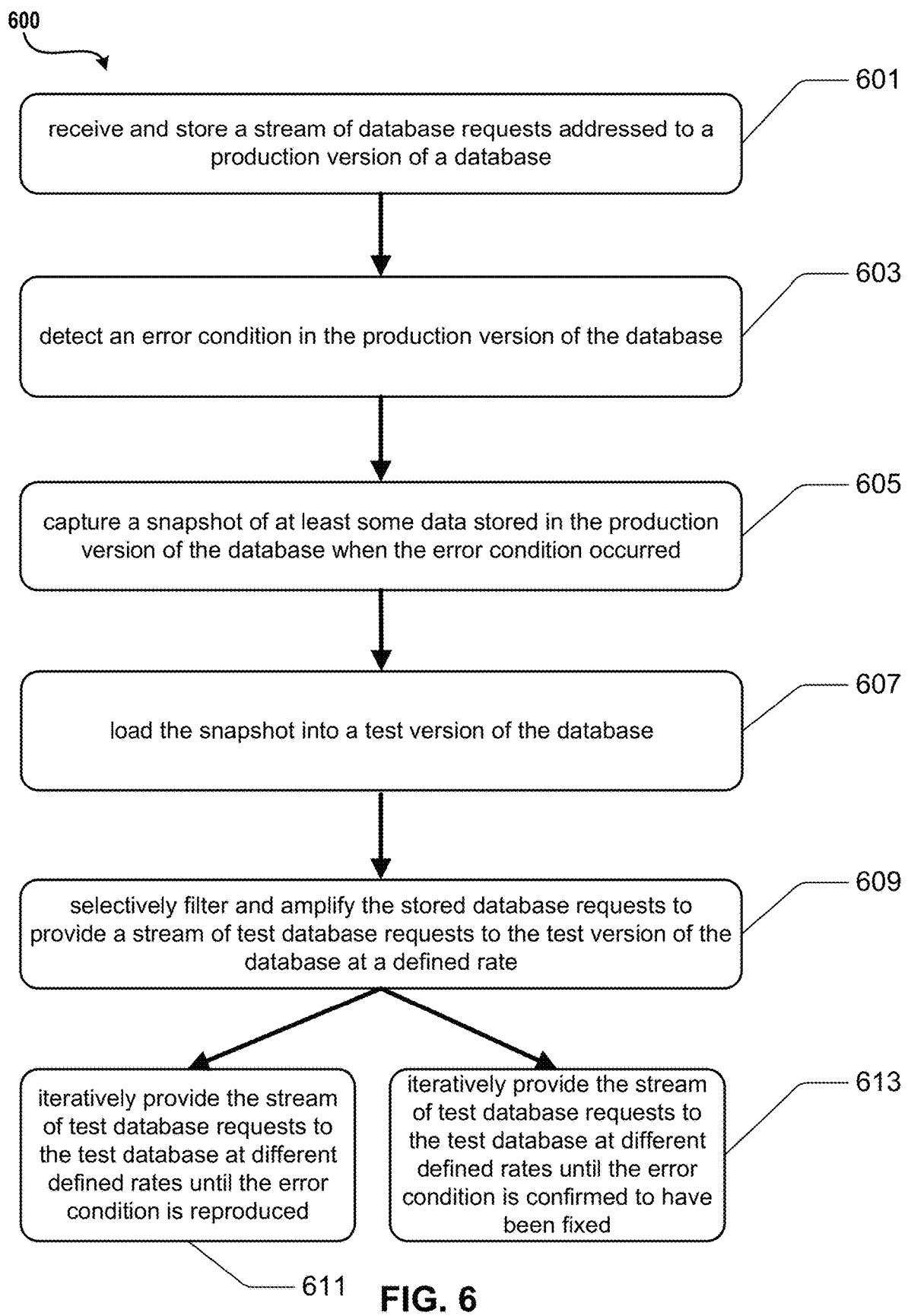
FIG. 6 is a flow diagram showing aspects of an illustrative routine, according to one embodiment disclosed herein.

FIG. 6 is a diagram illustrating aspects of a routine 600 for implementing some of the techniques disclosed herein.

The routine 600 begins at operation 601, which illustrates receiving and storing a stream of database requests 106 addressed to a production version of a database 110. The routine 600 then proceeds to operation 603, which illustrates detecting an error condition in the production version of the database 110. Operation 605 illustrates capturing a snapshot of at least some data stored in the production version of the database 110 when the error condition occurred. Operation 607 illustrates loading the snapshot into a test version of the database 132. Operation 609 illustrates selectively filtering and amplifying the stored database requests 112 to provide a stream of test database requests to the test version of the database at a defined rate.

From operation 609, the routine 600 may proceed to either Operation 611 or Operation 613. Operation 611 illustrates iteratively providing the stream of test database requests 106 to the test database 132 at different defined rates until the error condition is reproduced. Operation 613 illustrates iteratively providing the stream of test database requests 106 to the test database 132 at different defined rates until the error condition is confirmed to have been fixed.

Figure 7:
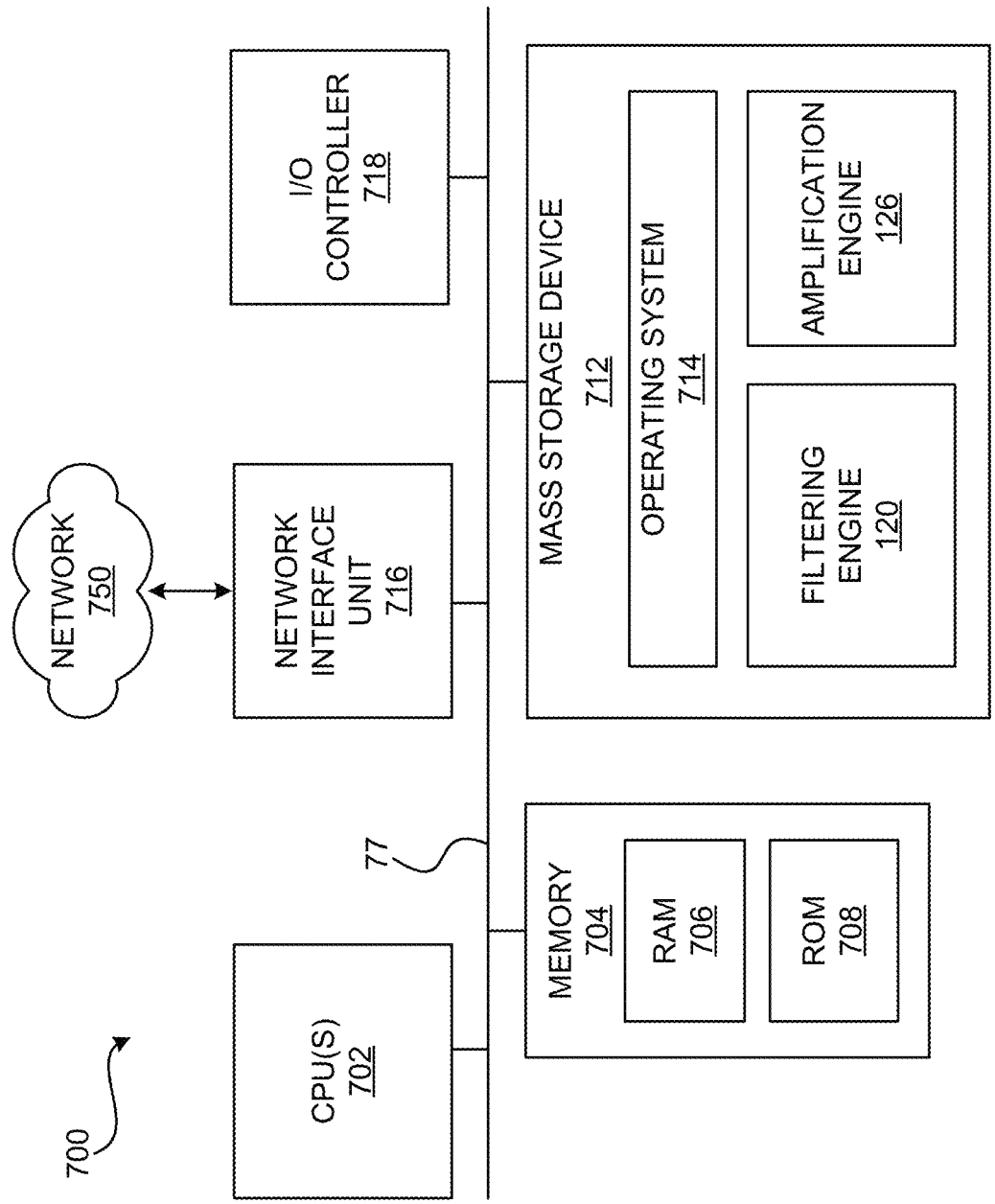
FIG. 7 is a computer architecture diagram illustrating aspects of an example computer architecture for a computer capable of executing the software components described herein.

FIG. 7 shows an example computer architecture for a computer capable of providing the functionality described herein such as, for example, a computing device configured to implement the functionality described above with reference to FIGS. 1-6. Thus, the computer architecture 700 illustrated in FIG. 7 illustrates an architecture for a server computer or another type of computing device suitable for implementing the functionality described herein. The computer architecture 700 might be utilized to execute the various software components presented herein to implement the disclosed technologies.

The computer architecture 700 illustrated in FIG. 7 includes a central processing unit 702 ("CPU"), a system memory 704, including a random-access memory 706 ("RAM") and a read-only memory ("ROM") 708, and a system bus 77 that couples the memory 704 to the CPU 702. A firmware containing basic routines that help to transfer information between elements within the computer architecture 700, such as during startup, is stored in the ROM 708. The computer architecture 700 further includes a mass storage device 712 for storing an operating system 714, other data, and one or more executable programs, such as filtering engine 120 and amplification engine 126.

The mass storage device 712 is connected to the CPU 702 through a mass storage controller (not shown) connected to the bus 77. The mass storage device 712 and its associated computer-readable media provide non-volatile storage for the computer architecture 700. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various implementations, the computer architecture 700 might operate in a networked environment using logical connections to remote computers through a network 750 and/or another network (not shown). A computing device implementing the computer architecture 700 might connect to the network 750 through a network interface unit 716 connected to the bus 77. It should be appreciated that the network interface unit 716 might also be utilized to connect to other types of networks and remote computer systems.

The computer architecture 700 might also include an input/output controller 718 for receiving and processing input from a number of other devices, including a keyboard, mouse, or electronic stylus (not shown in FIG. 7). Similarly, the input/output controller 718 might provide output to a display screen, a printer, or other type of output device (also not shown in FIG. 7).

It should be appreciated that the software components described herein might, when loaded into the CPU 702 and executed, transform the CPU 702 and the overall computer architecture 700 from a general-purpose computing system into a special-purpose computing system customized to facilitate the functionality presented herein. The CPU 702 might be constructed from any number of transistors or other discrete circuit elements, which might individually or collectively assume any number of states. More specifically, the CPU 702 might operate as a finite-state machine, in response to executable instructions contained within the software modules disclosed herein. These computer-executable instructions might transform the CPU 702 by specifying how the CPU 702 transitions between states, thereby transforming the transistors or other discrete hardware elements constituting the CPU 702.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 might include other types of computing devices, including hand-held computers, embedded computer systems, personal digital assistants, and other types of computing devices known to those skilled in the art.

It is also contemplated that the computer architecture 700 might not include all of the components shown in FIG. 7, might include other components that are not explicitly shown in FIG. 7, or might utilize an architecture completely different than that shown in FIG. 7. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 8:
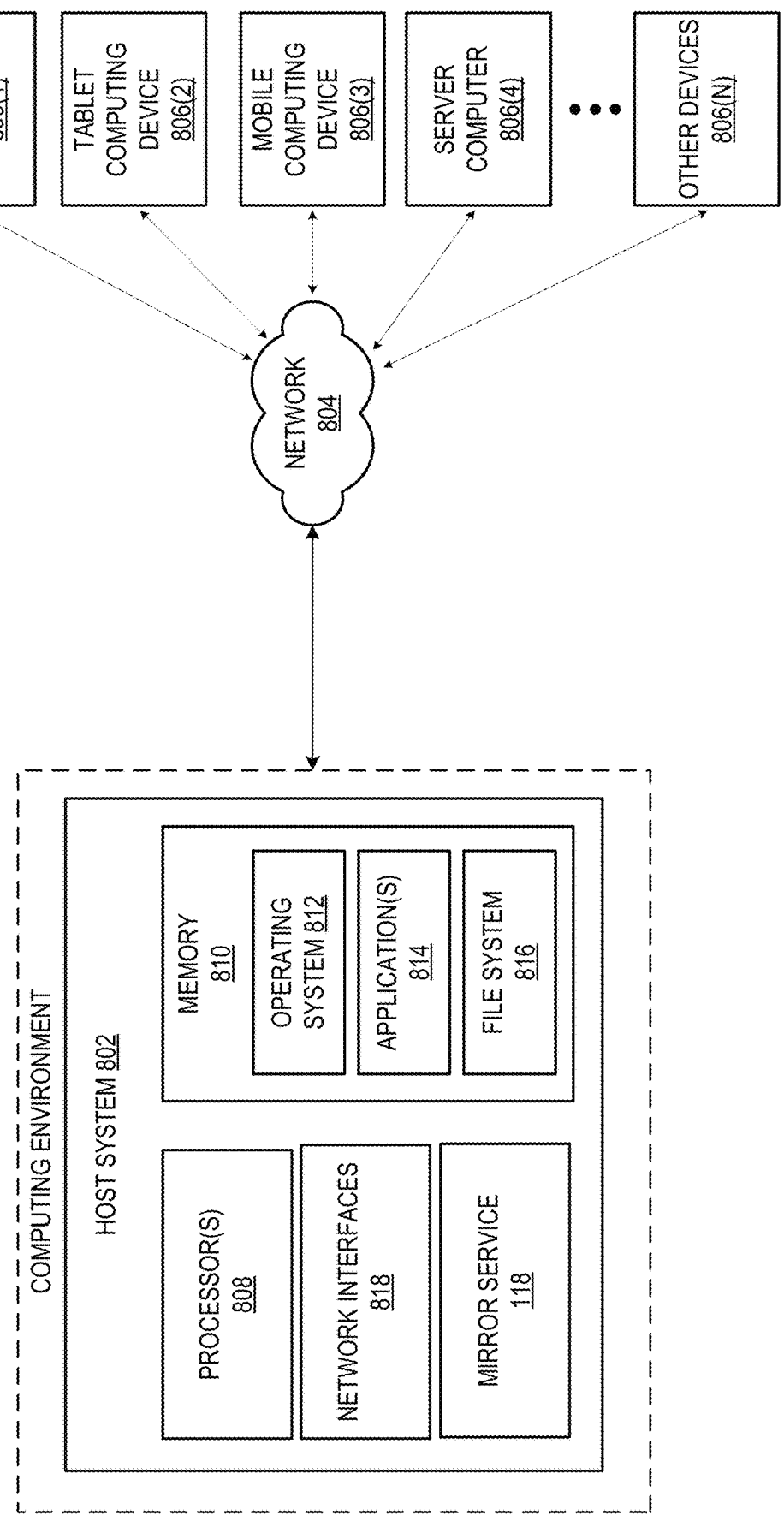
FIG. 8 is a data architecture diagram showing an illustrative example of a computing environment.

FIG. 8 illustrates an example computing environment capable of executing the techniques and processes described above with respect to FIGS. 1-7. In various examples, the computing environment comprises a host system 802. In various examples, the host system 802 operates on, in communication with, or as part of a network 804.

The network 804 can be or can include various access networks. For example, one or more client devices 806(1) . . . 806(N) can communicate with the host system 802 via the network 804 and/or other connections. The host system 802 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 802 can be provided by one or more servers that are executing as part of, or in communication with, the network 804. A server can host various services, virtual machines, portals, and/or other resources. For example, a can host or provide access to one or more portals, Web sites, and/or other information.

The host system 802 can include processor(s) 808 and memory 810. The memory 810 can comprise an operating system 812, application(s) 814, and/or a file system 816. Moreover, the memory 810 can comprise the mirror service 118 described above with respect to FIGS. 1-7.

The processor(s) 808 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 810.

The memory 810 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 802 can communicate over the network 804 via network interfaces 818. The network interfaces 818 can include various types of network hardware and software for supporting communications between two or more devices. The host system 802 may also include rules engine 819, which may be configured to implement aspects of the functionality disclosed herein.

The disclosure presented herein also encompasses the subject matter set forth in the following clauses.

Example Clause A, a computer-implemented method for identifying program defects by providing, to a second database, database requests captured from a production environment that have been selectively filtered or amplified, the method comprising: receiving database requests at a first database; selecting a first subset of database requests by filtering the received database requests based on one or more of a request type, a request complexity, or a request origin; selecting a second subset of database requests by amplifying database requests from the first subset of database requests to generate a defined rate of database requests; and applying the second subset of database requests to the second database.

Example Clause B, the method of Example A, wherein the received database requests are associated with one or more of a plurality of request criteria, wherein the received database requests have a distribution of request criteria, and wherein the second subset of database requests maintains, within a defined margin of error, the distribution of request criteria.

Example Clause C, the method of Example A, wherein a frequency, pattern, or rate of the received database requests vary according to behaviors of end users, and wherein the second subset of database requests maintains, within a defined margin of error, one or more of the frequencies, patterns, or rates.

Example Clause D, the method of Example A, wherein amplifying the first subset of database requests comprises: identifying an amplification factor associated with amplifying a rate of the first subset of database requests to the defined request rate; determining a probability that a database request of the first subset of database requests will be duplicated to achieve the amplification factor; determining a number of times the database request will be duplicated to achieve the amplification factor if the database request is selected at random based on the determined probability; determining at random, based on the determined probability, if the database request will be duplicated; and if the database request is determined to be duplicated, duplicating the database request the determined number of times.

Example Clause E, the method of Example A, wherein the defined rate of database requests is increased by increasing a percentage of the first subset of database requests that are amplified or increasing the number of times one or more database requests are amplified.

Example Clause F, the method of Example E, wherein a capacity test is performed on the second database by iteratively increasing the defined rate until a performance metric crosses a defined threshold or until the second database crashes.

Example Clause G, the method of Example A, wherein the database requests are received from a plurality of applications at a proxy of the first database, wherein the proxy of the first database filters the received requests and sends the filtered requests to the second database, and wherein a proxy of the second database performs the amplifying.

Example Clause H, the method of Example A, further comprising: detecting a defect in the second database, confirming that a fix to a previously identified defect works, confirming that the fix to the previously identified defect did not introduce other defects, or measuring a performance impact of a database configuration change.

Example Clause I, a computing system, comprising: one or more processors; and a computer-readable storage medium having computer-executable instructions stored thereupon which, when executed by the processor, cause the processor to: receive database requests at a first database; select a first subset of database requests by filtering the received database requests based on one or more filter criteria; select a second subset of database requests by amplifying database requests from the first subset of database requests to generate a defined rate of database requests, wherein amplifying database requests from the first subset of database requests comprises duplicating and culling database requests from the first subset of database requests; and provide the second subset of database requests to a second database.

Example Clause J, the computing system of Example I, wherein duplicating database requests comprises duplicating a defined percentage of database requests that meet a criteria.

Example Clause K, the computing system of Example I, wherein duplicating database requests comprises duplicating database requests a defined number of times.

Example Clause L, the computing system of Example I, wherein culling database requests comprises not selecting for inclusion in the second subset a defined percentage of database requests that meet a criteria.

Example Clause M, the computing system of Example I, wherein the filter criteria comprises one or more of a request type, a request complexity, or a request origin.

Example Clause N, the computing system of Example I, wherein database requests are selectively amplified based on a request type, a request complexity, or a request origin.

Example Clause O, the computing system of Example I, wherein the processor is further caused to: identify a defect in the second database by detecting a malfunction in the second database caused by at least one of the second subset of database requests.

Example Clause P, the computing system of Example I, wherein the first database comprises a production version of a database executing in a production environment, and wherein the second database comprises a pre-production version of the database.

Example Clause Q, the computing system of Example I, wherein the received database requests are filtered, amplified, and provided to the second database in real-time.

Example Clause R, A computer-readable storage medium having computer-executable instructions stored thereupon which, when executed by a processor of a computing device, cause the computing device to: receive database requests at a first database; store the received database requests; detecting an error condition in the first database; capture a snapshot of at least some data that was stored in the first database when the error condition occurred; select a first subset of database requests by filtering the stored database requests based on one or more of a request type, a request complexity, or a request origin; select a second subset of database requests by amplifying database requests from the first subset of database requests to generate a defined rate of database requests; and provide the second subset of database requests to a second database.

Example Clause S, the computer-readable storage medium of Example R, wherein the processor is further caused to: determine a rate of database requests received by the first database when the error condition occurred; and adjust the defined rate of database requests to match the determined rate.

Example Clause T, the computer-readable storage medium of Example R, wherein the processor is further caused to: provide the second subset of database requests to the second database at different defined rates until the error condition is reproduced.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines are described herein as being implemented, at least in part, by an application, component, and/or circuit. Although the following illustration refers to the components of specified figures, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

In closing, although the various technologies presented herein have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for identifying program defects by providing, to a second database, database requests captured from a production environment that have been selectively filtered and amplified, the method comprising:
- receiving database requests at a first database;
- selecting a first subset of database requests by filtering the received database requests based on one or more of a request type, a request complexity, or a request origin;
- generating a second subset of database requests that satisfies a defined rate and makeup of database requests by:
  - duplicating each of the requests included in the first subset of database requests at least one time;
  - identifying an amplification factor for amplifying database requests included in the first subset of database requests to satisfy the defined rate and makeup of database requests;
  - randomly selecting a portion of database requests from the first subset of database requests based on the amplification factor; and
  - duplicating the randomly selected portion of database requests at least one additional time until satisfying the defined rate and makeup of database requests; and
- applying the second subset of database requests to the second database.

2. The method of claim 1, wherein the received database requests are each associated with a plurality of request criteria and the received database requests represent a distribution of the plurality of request criteria, and wherein generating the second subset of database requests comprises maintaining, within a defined margin of error, the distribution of the plurality of request criteria.

3. The method of claim 1, wherein the received database requests are associated with a pattern representing behaviors of end users, and wherein generating the second subset of database requests comprises maintaining, within a defined margin of error the pattern representing the behaviors of the end users.

4. The method of claim 1, wherein generating the second subset of database requests comprises:
- determining a probability that a database request in the first subset of database requests will be duplicated to achieve the amplification factor;
- defining a quantity of the portion of database requests to be randomly selected based on the probability; and
- determining a number of times for duplicating the randomly selected portion of the database requests to achieve the amplification,
- wherein duplicating the randomly selected portion of the database requests is performed the determined number of times.

5. The method of claim 1, further comprising increasing the defined rate of database requests by or increasing a number of times at least one database request included in the randomly selected portion of database requests is duplicated.

6. The method of claim 5, further comprising increasing the defined rate of database requests by iteratively increasing the defined rate of database requests until a performance metric crosses a defined threshold or until the second database crashes.

7. The method of claim 1, wherein the database requests are received from a plurality of applications at a proxy of the first database, wherein the proxy of the first database performs the selecting the first subset of database requests and sends the filtered requests to the second database, and wherein a proxy of the second database performs the generating the second subset of database requests.

8. The method of claim 1, further comprising:
- detecting a defect in the second database responsive to applying the second subset of database requests to the second database; and
- responsive to detecting the defect:
- confirming that a fix to a previously identified defect works for the detected defect;
- confirming that the fix to the previously identified defect did not introduce other defects; and
- measuring a performance impact of a database configuration change associated with the fix.

9. A computing system, comprising:
- a processor; and
- a computer-readable storage medium having computer-executable instructions stored thereupon which, when executed by the processor, cause the processor to:
  - receive database requests at a first database;
  - select a first subset of database requests by filtering the received database requests based on one or more filter criteria;
  - generate a second subset of database requests that satisfies a defined rate of database requests by:
    - identifying an amplification factor for amplifying the database requests included in the first subset of database requests to satisfy the defined rate of database requests;
    - duplicating each of the requests included in the first subset of database requests at least one time; and
    - randomly selecting at least one database request included in the first subset of database requests based on the amplification factor and duplicating the randomly selected at least one database request at least one additional time until satisfying the defined rate of database requests; and
  - provide the second subset of database requests to a second database.

10. The computing system of claim 9, wherein duplicating the database requests included in the first subset of database requests comprises maintaining a defined percentage of database requests having a specific one of the one or more filter criteria.

11. The computing system of claim 9, wherein duplicating the database requests included in the first subset of database requests is performed a defined number of times.

12. The computing system of claim 9, wherein duplicating the database requests included in the first subset of database requests comprises excluding from the second subset a defined percentage of the received database requests having a specific one of the one or more filter criteria.

13. The computing system of claim 9, wherein the filter criteria comprises one or more of a request type, a request complexity, or a request origin.

14. The computing system of claim 9, wherein database requests are selectively duplicated based on a request type, a request complexity, or a request origin.

15. The computing system of claim 9, wherein the processor is further caused to:
- identify a defect in the second database by detecting a malfunction in the second database caused by at least one of the second subset of database requests.

16. The computing system of claim 9, wherein the first database comprises a production version of a database executing in a production environment, and wherein the second database comprises a pre-production version of the database.

17. The computing system of claim 9, wherein the received database requests are filtered, duplicated, and provided to the second database in real-time.

18. A computer-readable storage medium having computer-executable instructions stored thereupon which, when executed by a processor of a computing device, cause the computing device to:
- receive database requests at a first database;
- store the received database requests;
- detecting an error condition in the first database;
- capture a snapshot of at least some data that was stored in the first database when the error condition occurred;
- select a first subset of database requests by filtering the stored database requests based on one or more of a request type, a request complexity, or a request origin described by the snapshot;
- generate a second subset of database requests that satisfies a defined rate of database requests by:
  - identifying an amplification factor for amplifying the database requests included in the first subset of database requests to satisfy the defined rate of database requests;
  - duplicating each of the database requests included in the first subset of database requests at least one time; and
  - randomly selecting at least one of the database requests included in the first subset of database requests based on the amplification factor and duplicating the randomly selected at least one of the database requests at least one additional time until satisfying the defined rate of database requests; and
- provide the second subset of database requests to a second database.

19. The computer-readable storage medium of claim 18, wherein the computing device is further caused to:
- determine a rate of database requests received by the first database when the error condition occurred; and
- adjust the defined rate of database requests to match the determined rate.

20. The computer-readable storage medium of claim 18, wherein the computing device is further caused to:
- provide the second subset of database requests to the second database at different defined rates until the error condition is reproduced by the second database.

* * * * *